United States Patent
Knapp et al.

[11] Patent Number: 5,848,509
[45] Date of Patent: Dec. 15, 1998

[54] ENCAPSULATED INSULATION ASSEMBLY

[75] Inventors: Kenneth D. Knapp, Norristown; Eric S. Nilsson, West Chester; Murray S. Toas, Norristown, all of Pa.

[73] Assignee: CertainTeed Corporation, Valley Forge, Pa.

[21] Appl. No.: 521,927

[22] Filed: Aug. 31, 1995

[51] Int. Cl.$^6$ ................. F04B 1/62; B32B 1/06
[52] U.S. Cl. ............ 52/406.2; 52/406.1; 52/404.1; 428/74; 428/36.1
[58] Field of Search ............... 52/406.1, 406.2, 52/404.1, 404.2, 404.3, 408, 745.09, 742.12; 428/74, 76, 36.1

[56] References Cited

U.S. PATENT DOCUMENTS

| | | | |
|---|---|---|---|
| 2,028,253 | 1/1936 | Spafford | 52/406.1 X |
| 2,299,908 | 10/1942 | Leash | 52/406.1 |
| 2,913,104 | 11/1959 | Papket | 52/406.1 X |
| 3,141,206 | 7/1964 | Stephens | 52/406.2 X |
| 3,546,846 | 12/1970 | Sens. | |
| 3,922,425 | 11/1975 | Plumberg | 428/291 |
| 3,998,015 | 12/1976 | Scott et al. | 52/406.1 X |
| 4,524,553 | 6/1985 | Hacker | 52/406.1 X |
| 4,653,241 | 3/1987 | Bindi | 52/406.2 X |
| 4,972,644 | 11/1990 | Rumiez, Jr. et al. | 52/404.1 |
| 5,098,498 | 3/1992 | Hale et al. . | |
| 5,169,700 | 12/1992 | Meier et al. . | |
| 5,236,754 | 8/1993 | McBride et al. . | |
| 5,240,527 | 8/1993 | Lostak et al. . | |
| 5,277,955 | 1/1994 | Schelborn et al. . | |
| 5,318,644 | 6/1994 | McBride et al. . | |
| 5,362,539 | 11/1994 | Hall et al. . | |
| 5,400,569 | 3/1995 | Jones et al. . | |
| 5,486,401 | 1/1996 | Grant et al. | 52/406.2 X |
| 5,508,079 | 4/1996 | Grant et al. . | |

FOREIGN PATENT DOCUMENTS 55-164150   12/1980   Japan .

Primary Examiner—Winnie S. Yip
Attorney, Agent, or Firm—Paul and Paul

[57] ABSTRACT

Encapsulated glass fiber insulation includes a non-woven covering material over the top surface of a mineral fiber core, with the formed covering material extending adjacent the side surfaces. The covering material is greater in width than the sum of the widths of the top and two side surfaces, so that the edges of the formed covering material extend beyond the mineral fiber core.

10 Claims, 6 Drawing Sheets

ENCAPSULATED INSULATION ASSEMBLY

BACKGROUND OF THE INVENTION

1. Field of the Invention

The present invention relates to building insulation of the type including a blanket of mineral fibers and a facing sheet adhered to the top of the blanket to form an insullation assembly.

2. Brief Description of the Prior Art

Insulation blankets formed from mineral fibers, very often fiber glass, are well known and have long been used for building insulation. The thickness of the mineral fiber blanket is generally proportional to the insulative effectiveness or "R-value" of the insulation. A facing sheet, typically formed from Kraft paper, is often adhered to the mineral fiber blanket with a bituminous material, thus providing a vapor retarder. The facing sheet typically has edges which in their extended position project beyond the sides of the mineral fiber blanket for the purpose of securing the insulation in between wall studs, floor joists, roof rafters, and the like. The blanket is typically formed from glass fibers, often bound together using a resinous material. The insulation is typically compressed after manufacture and packaged, so as to minimize the volume of the product during storage and shipping and to make handling and installing the insulation easier. After the packaging is removed the insulation batt tends to quickly "fluff up" to its prescribed label thickness for installation.

Such insulation typically has exposed mineral fiber surfaces on two sides, two ends and on the one or both of the major surfaces of the blanket. The exposed surfaces permit air to be easily removed from the insulation during compression prior to packaging, and also permit air to quickly reenter the product after the packaging is removed at the installation site. However, the exposed surfaces can make installation troublesome, as contact may irritate exposed flesh, and some release of unbound fibers and dust into the working environment may occur.

Other prior art, such as that disclosed in U.S. Pat. No. 5,362,539, teaches an insulation assembly including a polymer film, which, being non-breathable, requires additional operations to manufacture, to apply openings for compression in packaging, for expansion in unpackaging, and providing only limited vapor transmission.

SUMMARY OF THE INVENTION

The present invention provides a solution to the problems associated with the unfinished surfaces of mineral fiber blankets. The present invention provides a mineral fiber insulation assembly comprising, in combination, a longitudinally extending mineral fiber core having two opposed major surfaces, opposed side surfaces and opposed end surfaces, and a web of non-woven covering extending over the side surfaces, one of the major surfaces, and partially over the other major surface. The covering is attached to a first major surface and at least one of the side surfaces. Preferably, the non-woven covering extends fully over a major surface and partially over the other major surfaces.

Further, it is preferred that the assembly further include a second covering or facing extending in a conventional manner over one of the major surfaces, and overlying the edges of the first covering. Preferably, the facing is also formed from a non-woven material.

Preferably, this second facing extends at least partially over the second major surface, and is adhered to the web and the first facing using adhesive. In other forms, this second facing can for example be comprised of a Kraft paper coated with a bituminous material which provides a vapor retardant surface.

The mineral fiber blanket can be any conventional thickness or width, and the product can be formed into batts, rolls, sheets, etc.

A non-woven facing advantageously permits air to escape quickly from the mineral fiber blanket when the insulation is chopped in its longitudinal direction to specific lengths and when it is compressed for packaging. A non-woven facing similarly advantageously permits air to quickly enter the compressed insulation when the packaging is removed at the insulation installation site, while also tending to reduce contact with the mineral fiber blanket itself during handling, and easing installation of the insulation. Further, during installation, and particularly in sidewall cavities and overhead, the assembly, having surfaces with a generally higher coefficient of friction provide for easier installation, eliminating problems with slippage in the cavity sometimes associated with having a plastic film attached to the insulation blanket. In addition, once installed, the assembly, because of the high porosity of the non-woven material freely permits the transmission of moisture (up to five times the amount), that could otherwise, with some plastic film envelopes, condense on the plastic, wetting the insulation material and reducing its effectiveness.

DETAILED DESCRIPTION

The insulation assembly of the present invention can be manufactured using conventional mineral fiber blankets or mats, for example, glass fiber mats produced from fibers formed from a glass melt, and treated with a binder such as phenol-formaldehyde resole resin-based binder. Insulation intended for thermally insulating buildings typically has a low glass fiber density, such as from about 0.3 to 1.5 pounds per cubic foot ($4.8 \times 10^{-3}$ g/cm$^3$ to $2.4 \times 10^{-2}$ g/cm$^3$), and often employs a Kraft paper facing coated on one side with a bituminous material. The coating is preferably applied in sufficient amount so as to provide an effective barrier or retarder for preferably most water vapor, for example, so as to reduce the water vapor permeability of the coated Kraft paper to no more than about one perm. In other forms, where a vapor retarder or barrier is not desired, the fiberglass fiber blanket has no facing.

Figure 1:
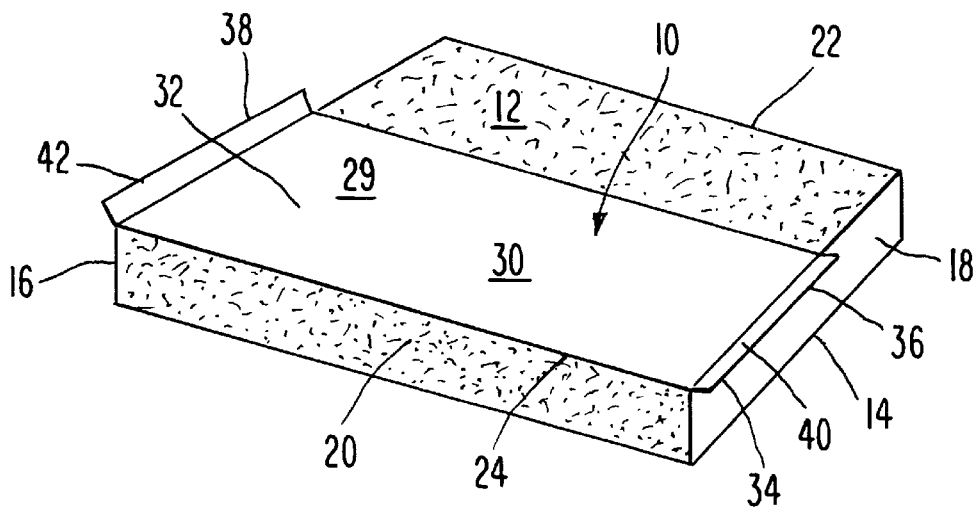
FIG. 1 is a perspective view of prior art type of insulation assembly, shown in an inverted position.

Referring now to the drawings, in which like reference numerals identify like elements throughout the several views, there is shown in FIG. 1 an perspective view of section of a prior art type of insulation assembly 10 shown for comparison purposes. The section is shown inverted from the orientation in which it is manufactured for illustration purposes, so that the physical bottom of the assembly (during manufacture) is shown facing up, etc. The insulation assembly 10 includes a low density glass fiber blanket or mat 20 formed from glass fibers treated with a phenol-formaldehyde resole resin-based binder, and having an lower major surface or bottom 12, an opposed generally parallel upper major surface or top 14, a pair of opposed generally parallel side surfaces 16, 18, and a pair of opposed, generally parallel end surfaces 22, 24, the glass fibers being generally oriented from one end surface 22 to the other end surface 24 and parallel the side surfaces 16, 18 and major surfaces 12, 14. The insulation assembly 10 also includes a bottom facing 30 extending over the entire bottom 12 of the glass fiber blanket 20 (shown cut away in FIG. 1 to reveal a portion of the bottom 12 of the glass fiber blanket 20). The bottom facing 30 is formed from Kraft paper and includes a central portion 29 coextensive with the bottom 12 of the glass fiber blanket 20 and a pair of edges or tabs 36, 38, normally folded inward and over the central portion 29 of the bottom facing 30 (not shown), but shown here projecting beyond the side surfaces 16, 18 of the glass fiber blanket 20, in position for securing the insulation assembly in between wall studs, roof rafters, floor joists, and the like, when the insulation assembly 10 is installed.

Figure 2:
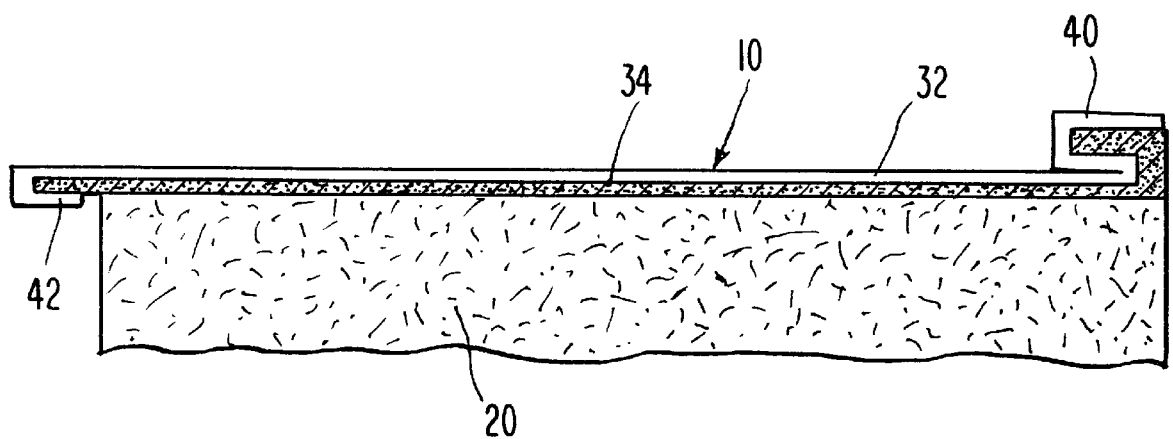
FIG. 2 is an elevational view of the insulation assembly of FIG. 1 as viewed from one end.

The bottom facing 30 includes a Kraft paper sheet 32, and the Kraft paper sheet 32 is coated with a layer of bituminous material 34, as is better seen in the end elevational view of FIG. 2. The layer of bituminous material 34 serves to adhere the bottom facing 12 to the bottom or lower major surface 12 of the glass fiber mat, and also serves a water vapor barrier or retarder when the insulation assembly 10 has been installed. The bottom facing 30 is in a heated state to soften the bitumin just prior to applying, or when applying, the bottom facing 30 to the bottom 12 of the glass fiber mat 20, so that the glass fibers become imbedded in the softened bituminous material layer 34. The bituminous material layer 34 secures the bottom facing 20 to the glass fiber mat 20 when the bitumin has cooled.

Optionally, the bottom facing 30 is secured to the bottom of the glass fiber mat 20 with an adhesive, such as a hot-melt adhesive. For example, an amorphous polypropylene hot melt adhesive can be applied in lengthwise strips to the facing 30 to secure the facing 30 to the glass fiber mat 20 (not shown).

Figure 3:
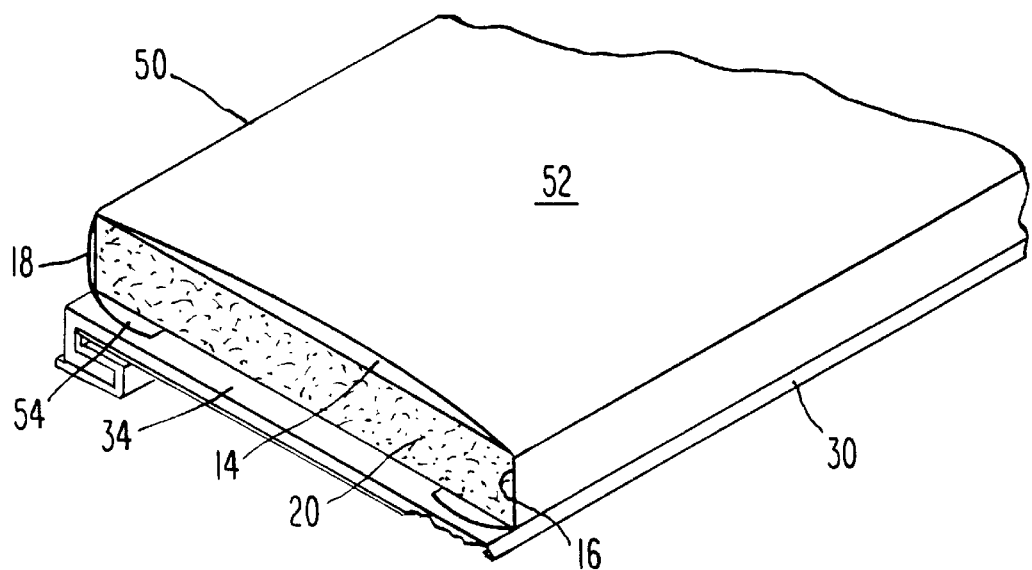
FIG. 3 is a perspective view of an encapsulated insulation assembly of the present invention, showing the left tab, with the right tab (fragmentally omitted) being a mirror image of the left tab.
Figure 4:
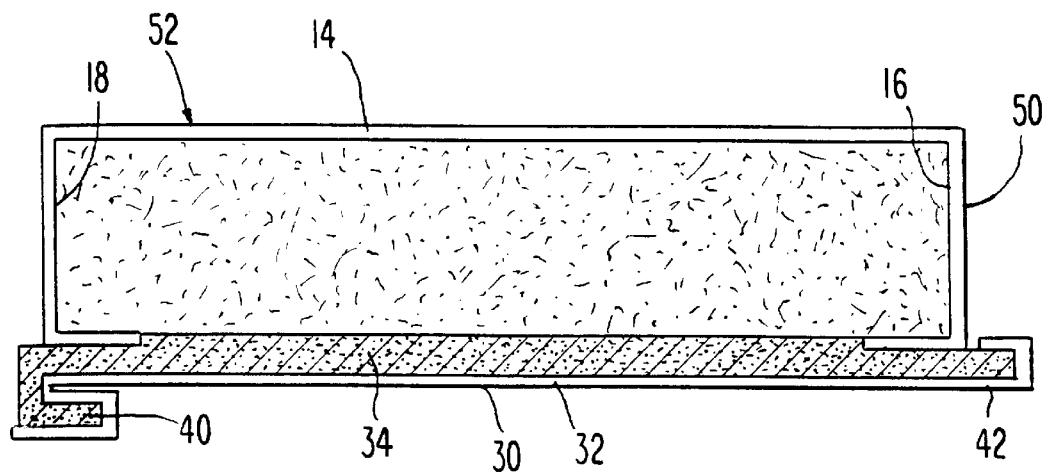
FIG. 4 is an elevational view of the insulation assembly of FIG. 3 as viewed from one end, but with left tab folded as in manufacturing and the right tab extended as both tabs would be for installation.

The present invention provides, in contrast, encapsulated glass fiber assemblies, for example such as shown in the perspective view of FIG. 3 and the end elevational view of FIG. 4. The encapsulated insulation assembly 52 includes an upper or top facing or covering 50 which encases the sides 16, 18 and top 14 of the glass fiber blanket 20, with the side edges 54 of the top facing 50 being formed in between the bottom facing 30 and the glass fiber blanket 20 proximate the sides 16, 18 of the glass fiber blanket. The covering 50 is preferably formed from a web of non-woven material. Non-woven materials are sheets of randomly oriented natural or synthetic fibers, such as polyolefins, polyester or rayon, sometimes secured together by a binder, typically based on a polymeric material, such as an acrylic resin, a vinyl-acrylic resin, or the like. The non-woven material may be, for example, spun-bonded polyester or polyolefin, or a thermally bonded polypropylene. The non-woven covering 50 is secured to at least a portion of the glass fiber mat, preferably using an adhesive material, such as a hot melt adhesive material, which can be applied to the web of covering 50 or to portions of the insulation sides 16, 18 and the top 14, just before the covering 50 is applied to the glass fiber blanket 20.

Alternatively, but much less preferably, the covering 50 may be formed from an integral plastic sheet material or film, such as polyethylene. The integral plastic film can be metallized, such as an aluminized polyethylene film or the like. If a integral plastic film is employed as covering 50, it is preferred that the film be perforated, such as by slits or holes, either during manufacture of the film or during production of the insulation assembly 10, so that air can easily enter and leave the glass fiber mat 20 when the insulation assembly 10 is compressed for packaging prior to shipment and correspondingly "fluffed up" when the packaging is removed and the insulation assembly 10 is unrolled and cut to size during installation on-site. Perforations in the film also allow for the necessary transmission of moisture when no vapor retarder properties are desired.

As seen in both FIG. 2 and FIG. 4, the edges 36, 38 of the bottom facing 30 are usually folded over themselves during manufacture to provide side tabs 40, 42 of increased thickness and strength and suitable for stapling or nailing the insulation assembly 10 in place to wall studs, roof rafters or floor joists during installation. During manufacture such tabs can be folded over to overlie the bottom facing 30, such as the left-hand tab 40 shown in FIG. 4, the tabs 40, 42 of the bottom facing 30 can be easily folded. If desired for installation purposes, such tabs can later be unfolded, such as the right-hand tab 42 shown in FIG. 4, to permit mechanically affixing the insulation assembly in place.

In another embodiment of the present invention, the bottom facing 30 is also formed from a web of non-woven material when no vapor retarder properties are desired of the assembly.

Figure 10:
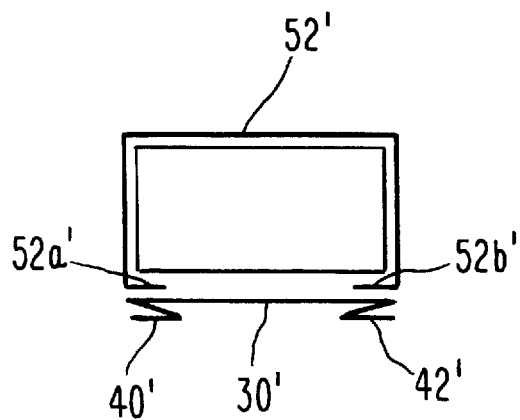
FIGS. 10, 11 and 12 are schematic illustrations of three encapsulated assemblies in accordance with this invention.

The schematic illustration of FIG. 10 shows insulation being covered by a nonwoven covering 52', covering the upper surface of the insulation, the sides, and with tabs 52a' and 52b' extending inwardly, as shown, with the tabs tucked in and held in place by the bottom facing 30', of Kraft paper facing with asphalt coating for acting as a vapor retarder, allowing for side tabs 40' and 42' suitable for stapling or nailing to wall studs or the like as described above.

Figure 11:
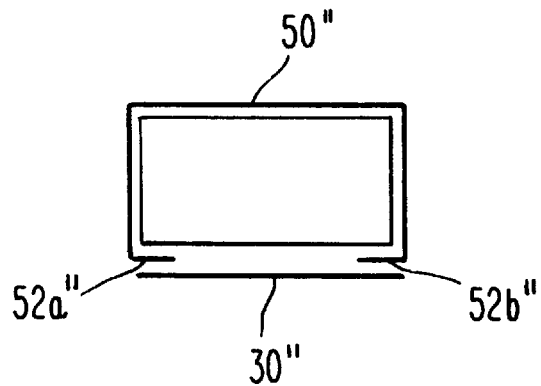

In FIG. 11, a similar illustration is presented to that of FIG. 10, but wherein the covering 50" as inwardly turned lips or tabs 52a" and 52b", with another non-woven facing 30" glued or otherwise adhesively secured thereto, holding the inturned ends 52a" and 52b", as for example when no vapor retarder is needed.

Figure 12:
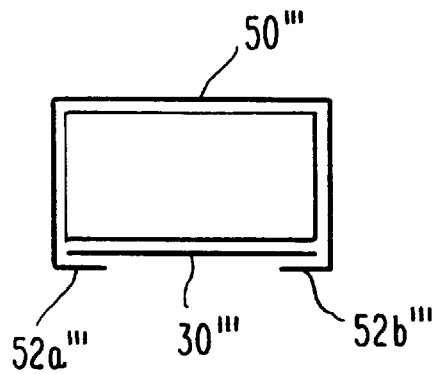

In FIG. 12, another illustration is presented like that of FIG. 11, wherein the non-woven covering 50''' is wrapped around the insulation, with its inwardly turned ends or tabs 52a''' and 52b''' being glued or otherwise adhesively secured outside the facing 30''', again, preferably where no vapor retarder in needed.

Figure 5:
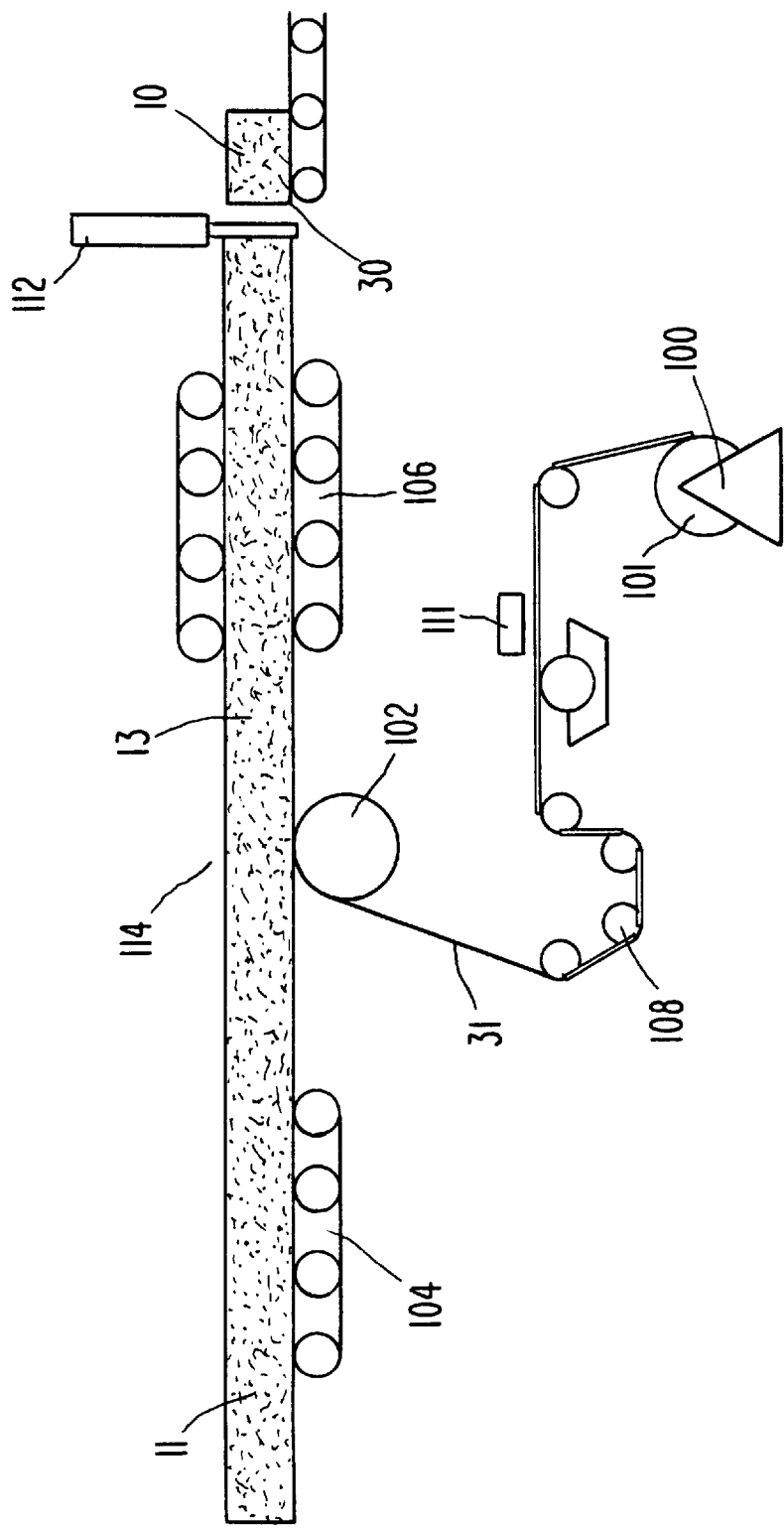
FIG. 5 is a schematic side elevational view of a process for producing the insulation assembly of FIG. 1.

A prior art process for producing the insulation assembly 10 of FIG. 1 is shown schematically in FIG. 5. A continuous glass fiber blanket or mat 11 formed in a conventional manner is presented by a feed conveyer 104 to a heated roll 102, to which is simultaneous supplied a continuous web of bitumen-coated Kraft paper 31, fed between the heated roll 102 and the glass fiber mat 11. The web of Kraft paper via roller 120 of FIG. 6 after being bitumen-coated is supplied from a roll 101 on pay-out stand 100, through an accumulator 108 for tensioning the web 31. In addition, the outside surface of the web can be marked at a marking station 111 with identifying information such as the R-value of the glass fiber mat and the production lot code before the web 31 is applied to the bottom of the glass fiber mat 11. Preferably, the edges of the web are folded over to form the tabs 40, 42 (FIG. 1) just prior to the web contacting the heated roll 102. The web 31 is oriented so that the bitumen-coated side of the web 31 faces the bottom of the glass fiber mat 11. The temperature is preferably selected to provide enough heat to soften the bituminous coating such that the bitumen-coated Kraft paper adheres to the underside of the glass fiber mat 11, thus forming a faced glass fiber mat 13. The faced glass fiber mat 13 is transported away from the heated roll 102 by a tractor section 106, and delivered to a chopper 112, which periodically chops the faced glass fiber mat 13 to form insulation assemblies 10. The insulation assemblies 10 so formed are then transported to packaging equipment (not shown).

Figure 6:
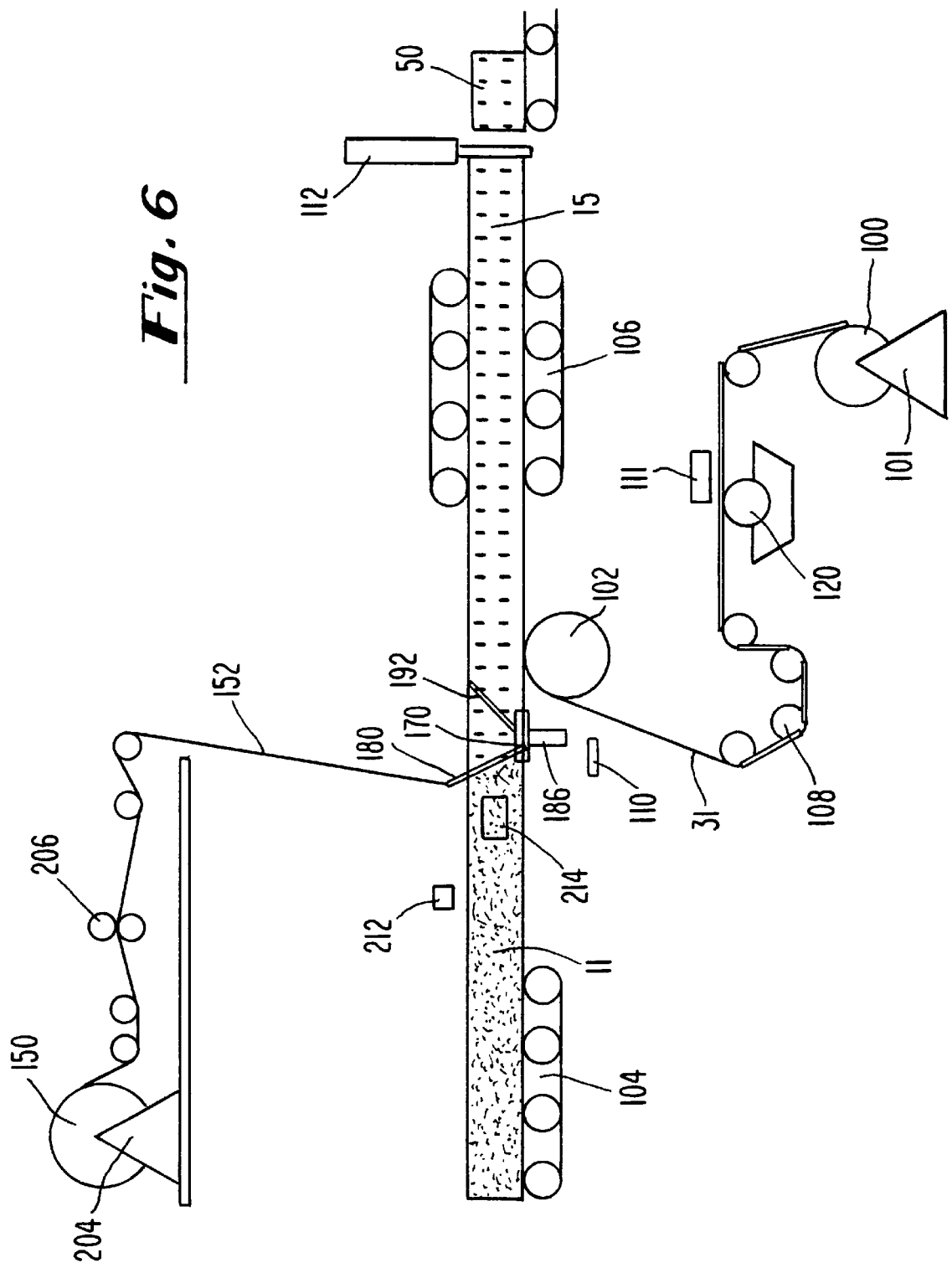
FIG. 6 is a schematic side elevational view of a process for producing the insulation assembly of FIG. 3.

A process for producing the encapsulated insulation assembly 50 of the present invention such as shown in FIG. 3 is shown schematically in FIG. 6. A continuous glass fiber mat 11 formed in a conventional manner and transported by a series of conveyers (not shown) to a web former 170, through which it passes. In a presently preferred embodiment, the top and sides of the glass fiber mat 11 are preferably sprayed with a hot melt or other suitable adhesive just before the glass fiber mat passes through the web former 170 applied by a series of glue applicators or spray nozzles 212, 214. The top glue applicators 212 preferably provide adhesive in a spray pattern, while the side applicators 214 preferably provide adhesive in a swirl pattern. The amount of adhesive and pattern in which the adhesive is applied are preferably selected to minimize peel back of the encapsulation web from the glass fiber mat during chopping and cutting in the field during installation. Simultaneously, a web of encapsulation material 152 is supplied to the web former 170. Optionally, adhesive can be applied to the web of encapsulation material 152 instead of or in addition to the adhesive applied to the glass fiber mat 11. The web of encapsulation material 152 is drawn from a roll of encapsulation material 150 mounted on a payout stand 204 positioned on a platform above the glass fiber mat 11. When the encapsulation material 152 is non-porous, then a perforator 206 can optionally be employed to periodically perforate the web of encapsulation material 150 for the purpose described below.

The web of encapsulation material 152 has a width sufficient to extend completely around the upper major face, side surfaces, and partially beneath the lower major face of the glass fiber mat 11. At the web former 170, the web of encapsulation material 152 is formed over the top and sides of the glass fiber mat 11. The web of encapsulation material 152 extends beyond the glass fiber mat 11 on either side, and is sucked under the glass fiber mat 11 by application of vacuum to the web former 170. The vacuum also tends to conform the web 152 to the glass fiber mat 11, thus minimizing loose and wrinkled material.

When encapsulation material 150 is non-porous, it has been found helpful in drawing the web around the glass fiber mat to perforate the web using the perforator 206, forming a series of holes which lie proximate the sides of the glass fiber mat when the encapsulation material is formed or draped over the mat at the web former 170. Immediately after the sides of the web of encapsulation material 152 have been drawn under the glass fiber mat 11, the glass fiber mat 11 passes over a heated roll 102, coming in contact with an adhesive-coated bottom facing 30 to provide an encapsulated glass fiber mat 15. The adhesive-coated bottom facing 30 may be or may have included a vapor retarder in accord with the desired finished product.

Preferably, a facing is applied to the bottom of the encapsulated glass fiber mat 15 such as described above, and the finished mat is chopped into individual encapsulated insulation pieces or assemblies 50, which are then packaged for shipment.

Figure 7:
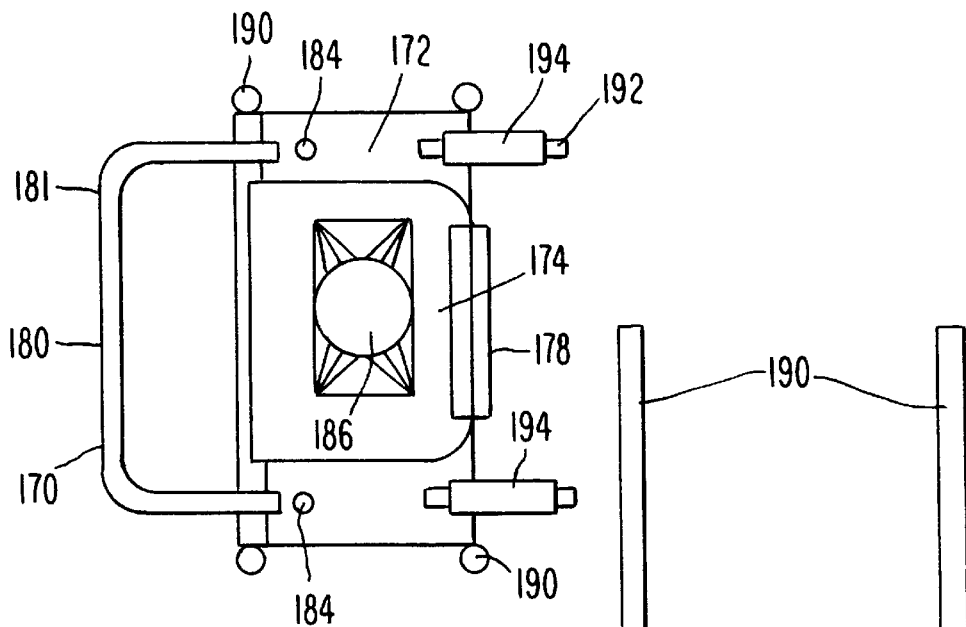
FIG. 7 is a top view of a web-forming device employed in the process of FIG. 6.
Figure 8:
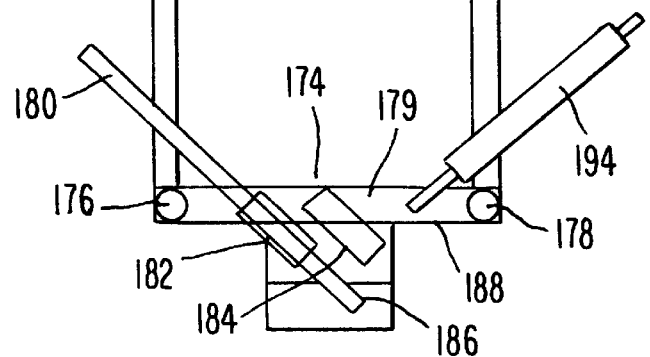
FIG. 8 is a side elevational view of the web-forming device of FIG. 7.
Figure 9:
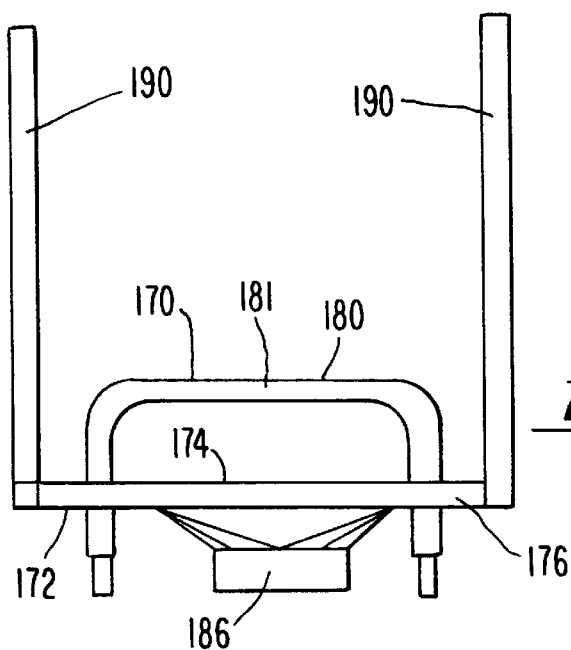
FIG. 9 is a front elevational view of the web-forming device of FIG. 7.

The web former 170 is better seen in the top view of FIG. 7, side view of FIG. 8, and the front view of FIG. 9. The web former 170 includes a base plate 172 and a parallel top plate 174 spaced from the base plate 172 by a front spacer 176 and a rear spacer 178 to form a vacuum chamber 179. A web-shaping hoop 180 extends diagonally from a pair of sleeves 182 fixed in the base plate 170 proximate the front of the web former 170 and spaced from the sides of the top plate 174. The top plate 174 has a width slightly less than that of the glass fiber mat 11, and rounded corners at the discharge end to reduce snagging and tearing of the encapsulation material. In operation, the glass fiber mat 11 pass through the hoop 180 and over the top plate 174. The hoop 180 is adjustably mounted in the sleeves 182 so that it can be suitably positioned for glass fiber mats of different thickness. An additional pair of sleeves 184 is also provided for mounting the hoop 180, to provide additional flexibility in positioning the hoop 180. A vacuum duct 186 extends downward through an opening 188 in the base plate 172. A vacuum is applied to the vacuum chamber 179 through the vacuum duct 186. The web former 170 is suspended by a set of four generally vertical hangers 190 fixed to the base plate 172 proximate the corners. The web former 170 is constructed in this case to receive a specific width of glass fiber mat, although it could be constructed to receive multiple width mats. The web former 170 optionally includes a pair of bars 192 extending upwardly and rearwardly from the rear side portions of the base plate 172, on each of which are rotationally mounted rollers 194 for pressing the web of encapsulating material 152 against the sides of the glass fiber mat 11 in the case of side adhesive application to assist in bonding.

In operation, as shown in FIG. 6 the web of encapsulating material 152 is drawn down from above the glass fiber mat 11, and under the horizontal portion 181 (see FIG. 7) of the hoop 180, and thereby formed over the top of the glass fiber mat 11 as the glass fiber mat 11 passes through the web former 170. The width of the hoop 180 is less than that of the web of encapsulating material, hence as the web is drawn through the hoop 180, the sides of the web are directed down by contact with the inside of the sides of the hoop 180, and against the sides of the glass fiber mat 11. The portions of the web of encapsulating material 152 on either side extending beyond the sides of the glass fiber mat 11 are drawn toward the vacuum chamber 179. These portions of the web of encapsulating material 152 are subsequently pressed up against the bottom of the glass fiber mat 11 by the heated roll as the encapsulated glass fiber mat 11 emerges from the discharge end of the web former 170. Preferably, a bottom facing is supplied to the bottom of the glass fiber mat 11 at the heated roll, so that the bottom facing adheres to the edges of the web of the encapsulating material which have been formed under the glass fiber mat by passage through the web former 170, as well as to the central portion of the bottom of the glass fiber mat 11.

Various modifications can be made in the details of the various embodiments of the processes, compositions and articles of the present invention, all within the scope and spirit of the invention and defined by the appended claims.

We claim:

1. A mineral fiber insulation assembly comprising, in combination, a longitudinally extending mineral fiber core having binder-treated glass fibers and having two opposed first and second major surfaces, opposed side surfaces and opposed end surfaces, and a covering of non-woven fabric material extending over the side surfaces and the first major surface, the non-woven covering being bonded to the first major surface and at least one of the side surfaces.

2. An assembly according to claim 1 wherein the non-woven fabric covering extends over both major surfaces.

3. An assembly according to claim 2 wherein the non-woven fabric covering extends at least partially over the second major surface and further comprising a bottom facing extending and bonded over the second major surface, said bottom facing comprising a non-woven fabric material.

4. An assembly according to claim 3 wherein the non-woven fabric covering extends at least partially over said bottom facing.

5. An assembly according to claim 3 wherein said bottom facing extends at least partially over said non-woven fabric covering.

6. An assembly according to claim 1 further comprising a composite facing comprising kraft paper coated with a bituminous material and extending over and bonded over the second major surface, the non-woven fabric covering extending at least partially over the second major surface.

7. A mineral fiber insulation assembly according to claim 6 wherein the non-woven fabric material is selected from the class consisting of polyolefins, polyesters, and rayon.

8. A mineral fiber insulation assembly according to claim 7 wherein the non-woven fabric material is selected from the class consisting of spun-bonded polyester, spun-bonded polyolefin, and thermally bonded polypropylene.

9. A mineral fiber insulation assembly according to claim 8 wherein the non-woven fabric material is thermally bonded polypropylene.

10. A mineral fiber insulation assembly comprising, in combination, a longitudinally extending mineral fiber core having binder-treated glass fibers, the core having two opposed first and second major surfaces, opposed side surfaces and opposed end surfaces, a covering of non-woven fabric material extending over the side surfaces and both major surfaces, the non-woven covering being bonded to the first major surface and at least one of the side surfaces, and a composite facing comprising kraft paper coated with a bituminous material and extending and bonded over the second major surface, the non-woven fabric material being selected from the class consisting of polyolefins, polyesters, and rayon.

* * * * *